United States Patent [19]

Lev et al.

[11] Patent Number: 6,057,832

[45] Date of Patent: May 2, 2000

[54] METHOD AND APPARATUS FOR VIDEO-ON-DEMAND WITH FAST PLAY CAPABILITY

[75] Inventors: Eitan Lev, Even Yehuda; Noam Cohen, Binyamina; Mordechai Teicher, Kfar Saba, all of Israel

[73] Assignee: V Soft Ltd., Yokneam Ilit, Israel

[21] Appl. No.: 08/982,287

[22] Filed: Dec. 2, 1997

[51] Int. Cl.[7] .................................................. H04N 7/12
[52] U.S. Cl. .............................. 345/327; 348/7; 348/12; 386/68
[58] Field of Search .............................. 386/68, 81, 82, 386/6, 7, 8, 111, 112; 348/409–413, 7, 390, 6, 10, 12, 13; 395/200.47, 200.48, 200.49; 345/327; H04N 7/12, 5/91

[56] References Cited

U.S. PATENT DOCUMENTS

| 5,428,393 | 6/1995 | Enokida | 348/390 |
| 5,434,678 | 7/1995 | Abecassis | 358/342 |
| 5,734,784 | 3/1998 | Tsinberg et al. | 386/81 |
| 5,754,773 | 5/1998 | Ozden et al. | 395/200.33 |

FOREIGN PATENT DOCUMENTS

97/12486  4/1997  WIPO .............................. H04N 7/16

*Primary Examiner*—Nathan Flynn
*Attorney, Agent, or Firm*—Benjamin J. Barish

[57] ABSTRACT

A method and apparatus for processing a coded data stream of video information (e.g., video-on-demand) for selective display according to a Normal PLAY Mode or a Fast PLAY Mode, by splitting the coded data stream into (a) anchor data constituted of anchor picture frames (e.g., I-frames) coded without reference to other picture frames, and (b) complemental data (e.g., B-frames and P-frames) complementing the anchor data; storing the anchor data in an anchor data file and the complemental data in a complemental data file; upon the selection of a Normal PLAY Mode, combining the data of both the anchor data file and the complemental data file to recompose and display the video information; and upon the selection of a fast PLAY mode, displaying only the data of the anchor data file.

18 Claims, 5 Drawing Sheets

METHOD AND APPARATUS FOR VIDEO-ON-DEMAND WITH FAST PLAY CAPABILITY

FIELD AND BACKGROUND OF THE INVENTION

The present invention relates to video-on-demand methods and apparatus, and particularly to such methods and apparatus which provide the capability of Fast PLAY in addition to Normal PLAY.

Video-on-demand (VOD) systems allow a number of subscribers, each having a computerized monitor (viewer) to order and control the display of a selected program from a large selection of programs stored in a central computer (server). The viewers communicate with the server via wide band links, such as shielded cables, optical fibres, or satelite antennas. The server uses a high-capacity storage device, e.g., a RAID disk array, and a powerful controller to retrieve and route the data stream in accordance with user commands.

Straightforward digital representation of color video information requires enormous storage and data flow capacities. For this reason, video compression techniques and standards have been devised which reduce storage and communication requirements dramatically. The most known standard today is the MPEG (Motion Pictures Expert Group) standard. It includes two types of coded video data, namely (a) anchor data, constituted of anchor picture frames coded without reference to other picture frames, and (b) complemental data, complementing the anchor data, and including predictive picture frames coded in accordance with motion compensation predictions from the anchor picture frames and the predictive picture frames. The anchor picture frames are commonly called I-frames (Intra-coded pictures). The predictive picture frames include P-frames, which are unidirectionally-predictive, and B-frames, which are bidirectionally-predictive, the latter being sometimes called interpolated frames.

A further picture type, namely the D-frame, is also provided to allow a simple but limited quality Fast-Forward PLAY Mode of operation.

In a typical VOD system, the original video information (e.g., analog) is compressed in an encoded form and is stored digitally in the server. On user command, the required program, in compressed form, is transmitted to the viewer. In the viewer, the data is decoded by displaying the sequence of anchor picture frames (I-frames) and reconstructing, between each of such frames, the appropriate sequence of predictive picture frames (P-frames and B-frames) from the respective anchor picture frames and other predictive picture frames.

While the basic, function of a VOD system is to retrieve and display a selected program, it would be highly desirable to provide a VOD system which offers the entire spectrum of operational modes of a home VCR (Video Cassette Recorder), including Normal PLAY, Fast Forward PLAY, Fast Backward PLAY, Skip, etc.

One way of accomplishing a Fast PLAY (Forward or Backward) in a compressed video system is by extracting and displaying only anchor picture frames from the compressed video streams. However, this is a disk-intensive and a CPU-intensive operation and could bring the server performance to its limits, especially if a number of users order a Fast PLAY simultaneously.

Chen et al U.S. Pat. No. 5,521,630 proposes a technique for meeting this problem, by dividing the data stream into segments and storing the segments in separate files, with each segment including an I-frame and a plurality of B-frames and P-frames until the next I-frame. In the example illustrated, there are ten files (disks). The first file includes segments S0, S10, S20, etc.; the second file includes segments S1, S11, S21, etc.; and the ninth file includes segments S9, S19, S29, etc. During Normal PLAY, the segments are retrieved and combined in round robin fashion; whereas in Fast PLAY, the segments are selected for display, according to either a segments sampling method or a segment placement method.

OBJECTS AND BRIEF SUMMARY OF THE PRESENT INVENTION

An object of the present invention is to provide another method and system for processing coded video information according to either a Normal PLAY Mode or a Fast PLAY Mode, as selected by the user.

According to one broad aspect of the present invention, there is provided a method of processing a coded data stream including video information supplied from a storage device for purposes of selectively displaying the video information according to either a Normal PLAY Mode, or a Fast PLAY Mode, as selected by a user, the method comprising: splitting the coded data stream into (a) anchor data, constituted of anchor picture frames coded without reference to other picture frames, and (b) complemental data, complementing the anchor data and including predictive picture frames coded in accordance with motion compensation predictions from anchor picture frames and other predictive picture frames; storing the anchor data in an anchor data file; storing the complemental data in a complemental data file; separate from the ancher data file upon the selection of the Normal PLAY mode, combining the data of the anchor data file and the complemental data file to recompose and display the video information of the coded data stream and upon the selection of a Fast PLAY Mode, displaying the video information of only the anchor data file.

Preferably, upon the selection of a fast PLAY mode, the video information of only the anchor data file is displayed, but in some cases it may also be desirable to display other data with that of the anchor data file.

According to further features in the described preferred embodiments, the method further comprises: generating and storing in a pointer file the address of each of the anchor picture frames in the anchor data file, and the predictive picture frames in the complemental data file; and utilizing the data in the pointer file to combine the data in the anchor data file and the complemental data file when recomposing and displaying the video information of the coded data stream.

The invention is particularly useful in systems wherein the video information in the coded data stream is MPEG compressed digital data, in which: the anchor picture frames are intra-coded picture frames (I-frames), and the predictive picture frames include unidirectionally-predictive picture frames (P-frames), and bidirectionally-predictive frames (B-frames).

According to further features in the described preferred embodiments, the coded data stream also includes audio information which is also stored in the complemental data file at addresses stored in the pointer file, and played back with the recomposed and displayed video information upon the selection of the Normal PLAY Mode. The data stream may also include user-input information (e.g., headers, text, etc.) to be played back with the recomposed and displayed video information.

According to still further features in the described preferred embodiments, the method may optionally further comprise: generating an Anchor-Start file to contain the addresses in the pointer file to the starts of anchor picture frames to be used during a SKIP mode of operation; and utilizing the Anchor-Start file for controlling the pointer file when recomposing and displaying the video information upon the selection of a SKIP Mode of Operation.

According to another aspect of the present invention, there is provided a method of processing a coded data stream including video information supplied from a storage device for purposes of selectively displaying the video information according to a Normal PLAY Mode, a Fast Forward PLAY Mode, or a Fast Backward PLAY Mode, as selected by the user, the method comprising: storing the coded data in a mass storage device in the form of a sequence of picture frames; upon the selection of the Normal PLAY mode, displaying the complete sequence of picture frames; upon the selection of the Fast Forward PLAY Mode, displaying in the forward sequence only selected sample picture frames of the stored sequence; and upon the selection of the Fast Backward PLAY Mode, storing selected sample picture frames in the reverse order in a reverse buffer, and then displaying the selected sample picture frames in the reverse buffer. Such an arrangement permits reading a sequence of the picture frames in the forward order from the reverse buffer during the Fast Backward PLAY Mode, which is much more efficient than reading the same frames, one-by-one, in the reverse order.

The invention also provides apparatus for processing a coded data stream in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
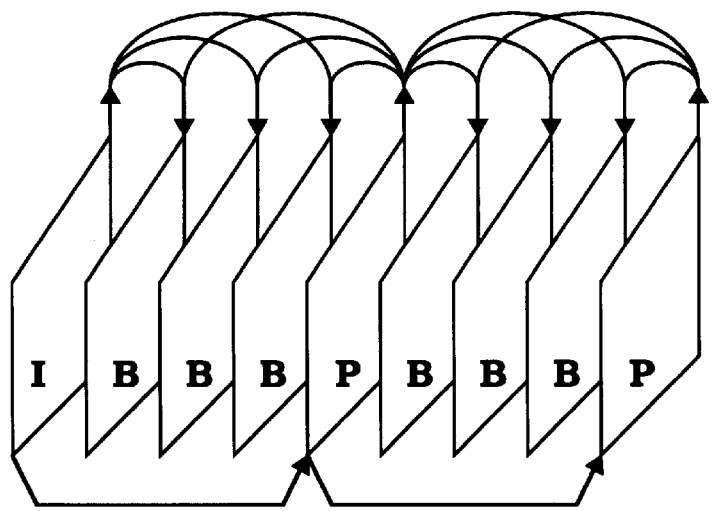
FIG. 1 illustrates a typical sequence of picture frames of digital video data compressed in accordance with the MPEG format.

As indicated earlier, the present invention is particularly useful, and is therefore described below, for processing digital data which has been compressed in accordance with the MPEG (Motion Pictures Expert Group) format. FIG. 1 schematically illustrates a typical sequence of picture frames of digital video data compressed in accordance with the MPEG format.

Thus, the sequence of picture frames shown in FIG. 1 begins with an I-frame, which is an intra-coded picture coded without reference to other picture frames. The I-frames are anchor frames providing access points where decoding can begin, and are coded with only a moderate compression ratio.

The sequence of picture frames illustrated in FIG. 1 further includes two types of predictive coded picture frames which are compressed by using motion-compensated predictions. The P-frames predict unidirectionally from a past I-frame or P-frame; whereas the B-frames predict bi-directionally from both past and future picture frames and therefore provide the highest degree of compression.

The organization of the three types of picture frames in a sequence or sequent may be determined by the encoder according to the requirements of the particular application. Since the MPEG format for compression of digital video data is extensively described in the literature (for example in the above-cited Chen et al U.S. Pat. No. 5,521,630), it is not further described herein.

Figure 2:
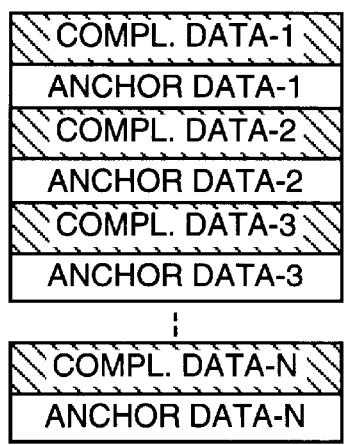
FIG. 2 is a schematic block diagram illustrating the data organization in a typical MPEG compressed video file.

FIG. 2 shematically illustrates the typical data organization in a conventional MPEG compressed video file of recorded video programs, e.g., motion-pictures. Thus, the illustrated data organization includes blocks of anchor data interspersed with blocks of complemental data complementing the anchor data when recomposing and displaying the recorded video program. In the MPEG system, the anchor data would be constituted by the I-frames; whereas the complemental data would include the P-frames and the B-frames. The complemental data would also include other miscellaneous data, such as the audio information to be reproduced during the display of the recorded video program; user-input information (e.g., headers, texts, etc.) to be reproduced with the recorded video pictures; synchronization data; etc. A conventional video viewer is programmed to decode and combine the data from the anchor data blocks and the complemental data blocks illustrated in FIG. 2 to produce a series of displayable video frames accompanied by sound, text, titles, etc.

Figure 3:
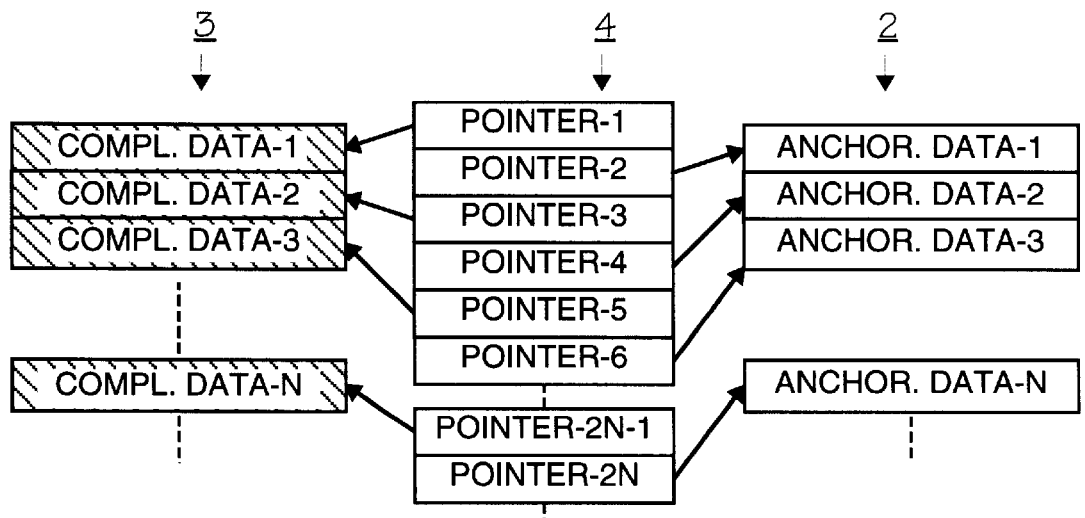
FIG. 3 is a schematic block diagram illustrating the data organization in a mass storage device when the video data is split according to the present invention.

FIG. 3 illustrates how the data orgranization of FIG. 2 is modified in accordance with the present invention to enable selective displaying in an efficient manner of the video information according to either a Normal PLAY Mode, or a Fast PLAY Mode, as selected by the user. Thus, as shown in FIG. 3, the coded data stream illustrated in FIG. 2 is split into anchor data which is stored in an Anchor Data file 2, and complemental data which is stored in a Complemental Data file 3. The system also generates a Pointer file 4 which stores the addresses of each of the anchor data frames in file 2, and the complemental data frames in file 3. As will be described below, the Pointer file 4 is used, upon the selection of the Normal PLAY Mode, to combine the data from both the Anchor Data file 2 and the Complemental Data file 3 in order to recompose and display the original video information. However, upon the selection of a Fast PLAY Mode, only the anchor data in the Anchor Data file 2 is displayed to provide a Fast PLAY of the video.

Figure 4:
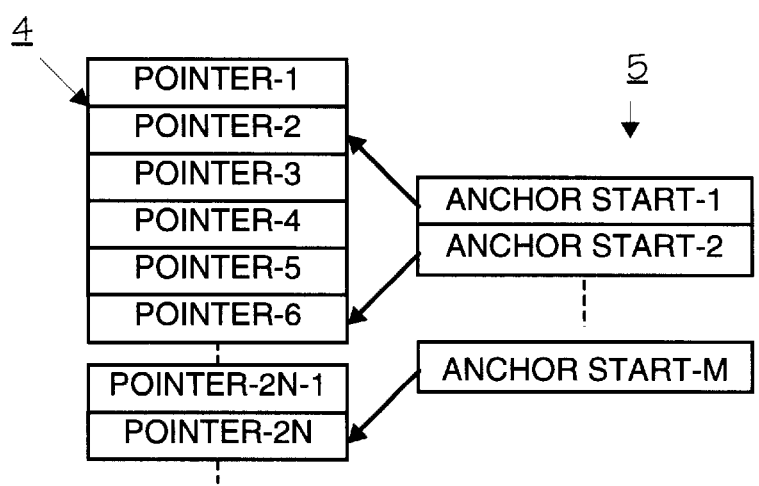
FIG. 4 is a schematic block diagram illustrating the inclusion, in the mass storage device, of an Anchor Start file to be used during a SKIP operation.

FIG. 4 illustrates the optional provision of an Anchor-Start file 5 to enable direct access to the beginning of selected anchor frames in the Anchor Data file 2 of FIG. 3, by identifying the records of the Pointer file 4 which point at anchor-starts in the Anchor Data file 2. Thus, the Anchor-Start file 5 contains the addresses in the Pointer file 4 of anchor frame starts to be used during a SKIP operation; and during such operation, it controls the Pointer file 4 when that file is used for recomposing and displaying the video information.

Figure 5:
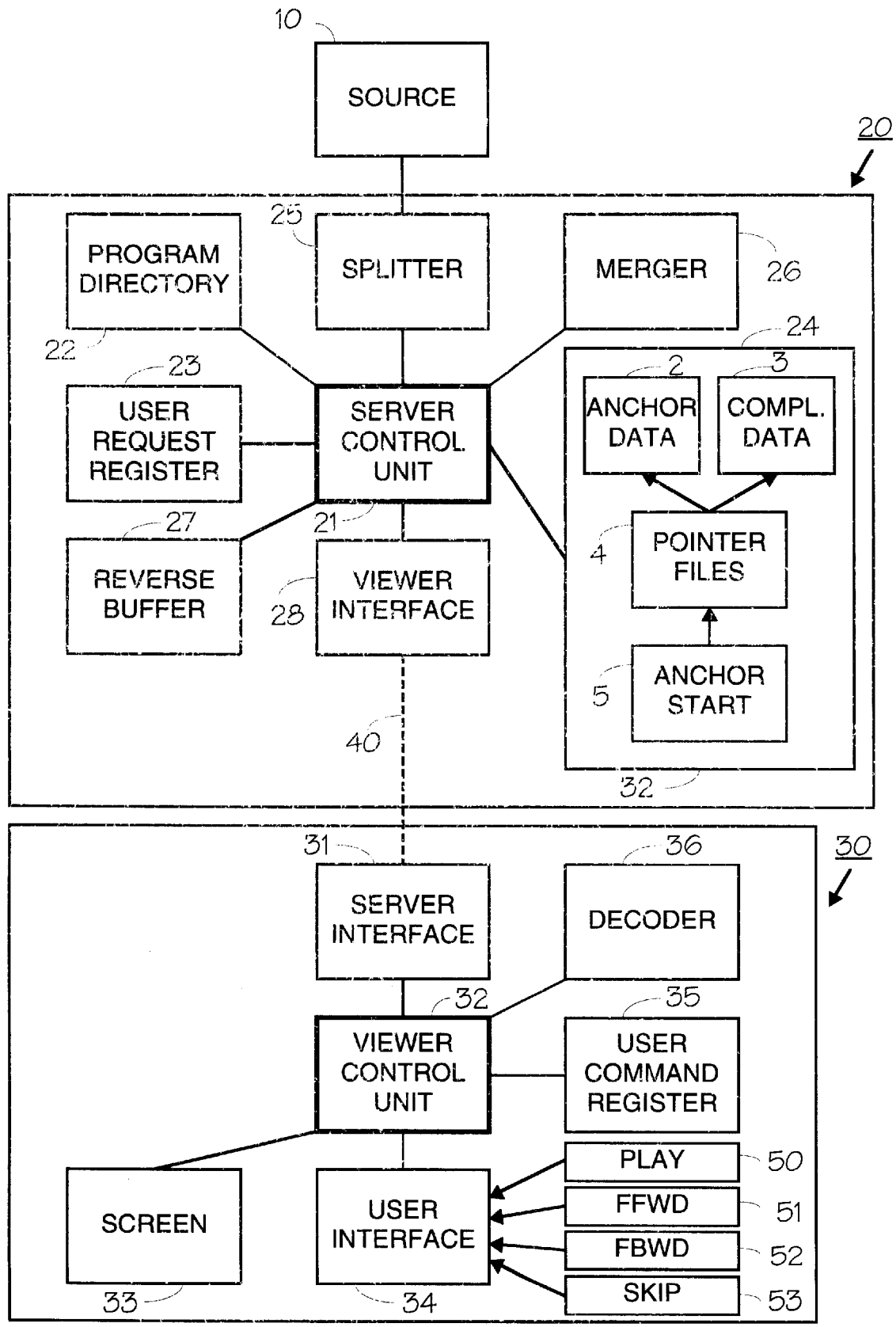
FIG. 5 is a schematic block diagram illustrating the main elements of a video system constructed in accordance with a preferred embodiment of the present invention.

FIG. 5 illustrates the main blocks of a video-on-demand (VOD) system in accordance with the present invention to provide Normal PLAY (when receiving the PLAY command), as well as the capability of Fast PLAY both in the forward direction (when receiving the FFWD command), and in the backward direction (when receiving the FBWD command). The illustrated system includes: a mass-storage device 10 containing recorded video programs (e.g., motion pictures, news items, sport events, entertainment programs, professional presentations, etc.) in the MPEG compressed-video format according to FIG. 2; a server unit 20 at a central location; and a plurality of viewer units 30 at various remote locations, each communicating with the server unit 20 via a wide band communication link 40, such as shielded cables, optical fibres, satellite antennas, etc.

The server unit 20 includes a server control system 21 which controls the overall operation of the server unit. It also includes a program directory 22 containing information regarding the contents of each of the programs, as well as an identification of the respective files from the mass storage device 10. This information is used by the users of the viewer units 30 to select programs and to access the files of the selected programs. These functions are performed via a user request register 23 which receives the user commands from the viewer units 30 (e.g., the selected program) as well as control commands such as the PLAY, FFWD, FBWD and SKIP commands. The foregoing functions may be performed by conventional server systems.

In accordance with the present invention, the server unit 20 includes a mass storage device 24 containing the above-described Anchor Data file 2, Complemental Data file 3, and Pointer file 4 illustrated in FIG. 3. The server unit 20 further includes a splitter 25 which splits the coded data stream received according to the data organization illustrated in FIG. 2 into anchor data (e.g., I-frames) for storing in the Anchor Data file 2, and complemental data (e.g., P-frames, B-frames, audio, headers, text, etc.) for storing in the Complemental Data file 3, at addresses stored in the Pointer file 4 illustrated in FIG. 3.

If the system also includes the option of providing the capability of performing a SKIP operation in accordance with FIG. 4, then the system also generates in mass storage device 24, the Anchor-Start file 5 illustrated in FIG. 4 to contain the addresses in the Pointer file 4 of the starts of anchor picture frames to be used during a SKIP operation.

The server unit 20 further includes a merger module 26 coupled to the server control system 21 and effective to recompose the video information from the mass storage device 24 into a compressed video stream, according to the user request command in register 23. Thus, if the user request is a Normal PLAY command, merger module 26 is effective to recompose the video information to include both the anchor picture frames (e.g., the I-frames) from the Anchor Data file 2, and the predictive picture frames (e.g., the B-frames and P-frames) from the Complemental Data file 3, as controlled by the Pointer file 4. On the other hand, if the user request is a Fast PLAY (FFWD or FBWD) command, then the server control system 21 passes only the anchor picture frames from the Anchor Data file 2 to be decoded and displayed.

The Fast PLAY mode of operation may be a Fast Forward PLAY (FFWD), or a Fast Backward PLAY (FBWD). If the command is FFWD, the server passes only the anchor frames from the Anchor Data file 2 as described above. For purposes of executing a FBWD command, the server 20 includes a reverse buffer 27 which is used to execute that command. Thus, in the event of a FBWD command, the anchor frames from Anchor Data file 2 are temporarily stored in reverse order in the reverse buffer 27 and are then outputted therefrom to the viewer unit in the forward order. Such an arrangement using the reverse buffer 27 is considered to be more efficient than reading the same frames, one-by-one, in the reverse order when recomposing the data stream transmitted to the viewer unit.

The video stream recomposed by the server control system 21 as described above is transmitted, via viewer interface 28 and communication link 40, to the respective viewer unit 30. Each of the viewer units 30 includes a server interface 31 for receiving the compressed video stream, and a viewer control system 32 processing the video stream for display in the display screen 33 of the viewer unit.

Each viewer unit 30 further includes a user interface 34 enabling the user to input the appropriate command for the desired mode of operation. FIG. 5 illustrates four such commands: PLAY 50, FFWD 51, FBWD 52 and SKIP 53. The user command is stored in the user comand register 35 and is communicated via communication link 40 to the server unit 20 where it is stored in the user request register 23 and used to control the server control system 21 in the manner described above.

Each viewer 30 further includes a decoder 36 which converts the stream of compressed video received from the server 20 into a stream of displayable frames, according to the user command as described above. These frames are displayed in screen 33 of the viewer unit.

Figure 6:
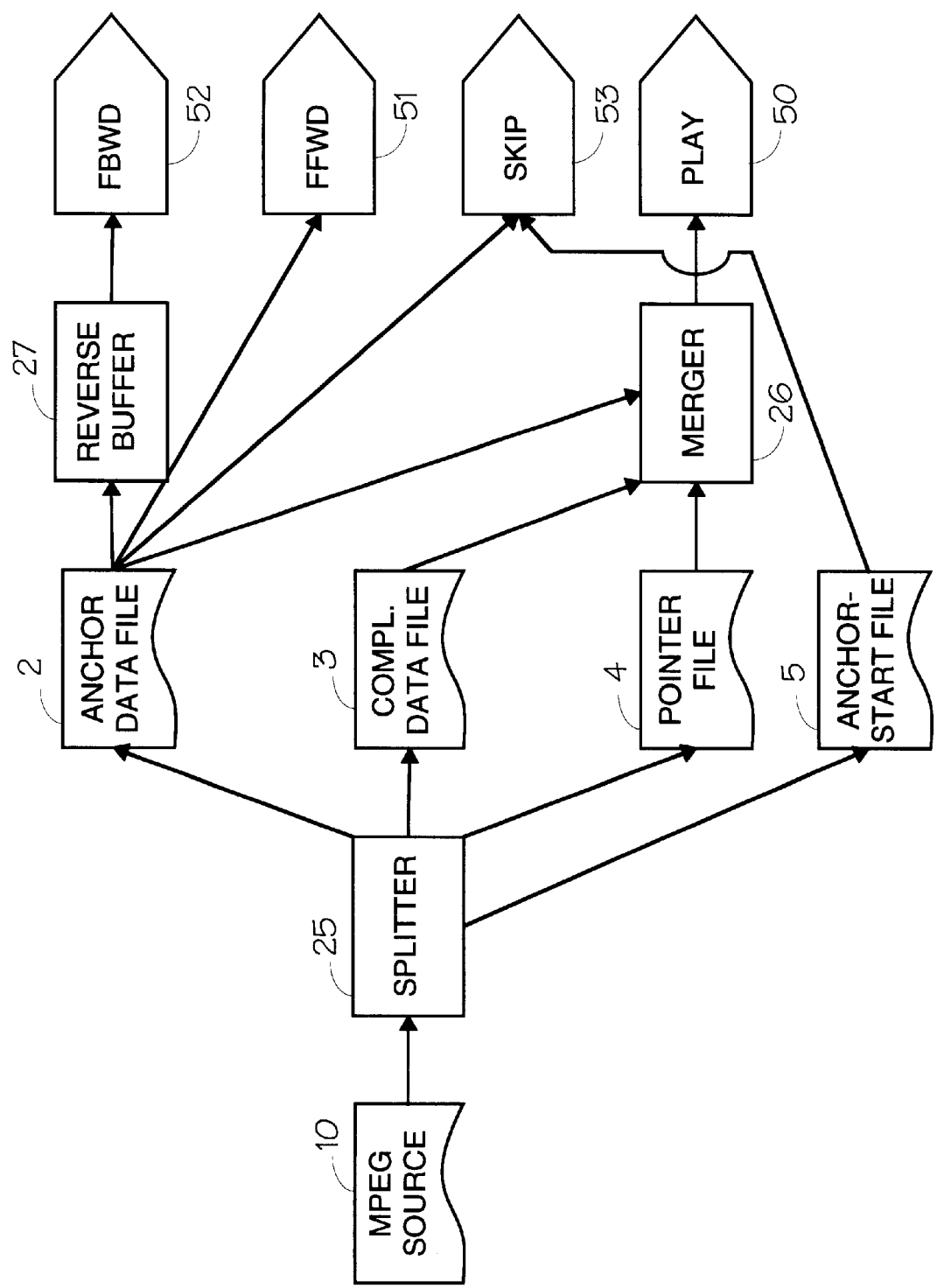
FIG. 6 is a schematic flow diagram illustrating the flow of data in four operational modes in the video system of FIG. 5.

FIG. 6 schematically illustrates the data flow in the above-described four operational modes in the preferred embodiment illustrated in FIG. 5. FIG. 6 illustrates the MPEG source 10, which may be prepared either in an off-line or on-line manner and includes each of the programs stored in the program directory 22 in a standard MPEG-compressed file arranged according to the file structure illustrated in FIG. 2. Each such MPEG-compressed file is transformed by splitter unit 25 of the server unit 20 into three files 2, 3, 4, according to FIG. 3, or also to include the Anchor-Start file 5 illustrated in FIG. 4. The so-split files are stored in the mass storage unit 24 of the server.

Thus, the Anchor Data file 2 includes the anchor picture frames (e.g., I-frames in the MPEG system); the Complemental Data file 3 includes the predictive picture frames (B-frames and P-frames), as well as other miscellaneous information to complement the anchor data (e.g., audio information, user-input in headers, and text, and synchronization information); and the Pointer file 4 includes the addresses of each of the frames in the Anchor Data file 2 and the Complemental Data file 3 such as to enable the frames of the two files to be merged upon the selection of a Normal PLAY Mode, as will be described below. The mass storage device 24 may also include an Anchor-Start file 5 as described above with respect to FIG. 4 to enable a SKIP operation to be performed upon the user-inputting a SKIP command 53.

All the foregoing files may be prepared on-line, or off-line so as to be ready to respond to a request by a user via the user's viewer unit 30.

Thus, if the viewer inputs a Normal PLAY Command via the user interface 34 as indicated by block 50 in FIG. 5, the merger circuit 26 of the server unit 20 is activated to recompose the video information stored in compressed form in the Anchor Data file 2 and in the Complemental Data file 3, under the control of the Pointer file 4, and to transmit this information, according to the MPEG compressed file structure illustrated in FIG. 2, to the viewer unit 30. Decoder 36 (FIG. 5) of the viewer unit transforms the so-transmitted data received by the viewer unit into a stream of displayable frames including the anchor frames (I-frames) from file 2 and the predictive frames (B-frames and P-frames) from file 3, for display on screen 33 of the viewer unit, as in any other display of MPEG-coded video.

When the Fast Forward PLAY (FFWD) command is inputted into the viewer unit, as indicated by block 51 in FIG. 6 only the anchor frames (I-frames) in the Anchor Data file 2 are transmitted to the viewer unit and decoded by its decoder 36, so that only the I-frames of the MPEG code video are displayed on screen 33 of the viewer unit.

When the Fast Backward PLAY (FBWD) command is inputted, as indicated by block 52 in FIG. 6, only the I-frames in the Anchor Data file 2 are transmitted to the viewer unit, as in the case of the FFWD command (block 51) described above. However, in the case of a FBWD command (block 52), the I-frames are first temporarily stored in the reverse buffer 27 and are then outputted in the reverse order to the viewer unit 30 via the communication link 40. Thus, the viewer unit 30 receives the I-frames in the reverse order for decoding by its decoder 36 and for display on its screen 33.

If a SKIP command is inputted, as indicated by block 53 in FIG. 6, the Anchor-Start file 5 is utilized in the server 20 to control the Pointer file 4 in order to output only the Anchor data from file 2 selected for the respective SKIP operation.

It will be appreciated that the viewer unit 30, except for the addition of the FFWD, FBWD and SKIP controls to the user interface 34, may otherwise be of a conventional VOD construction since substantially all the processing of the video data in accordance with the present invention is done in the server 20.

Figure 7:
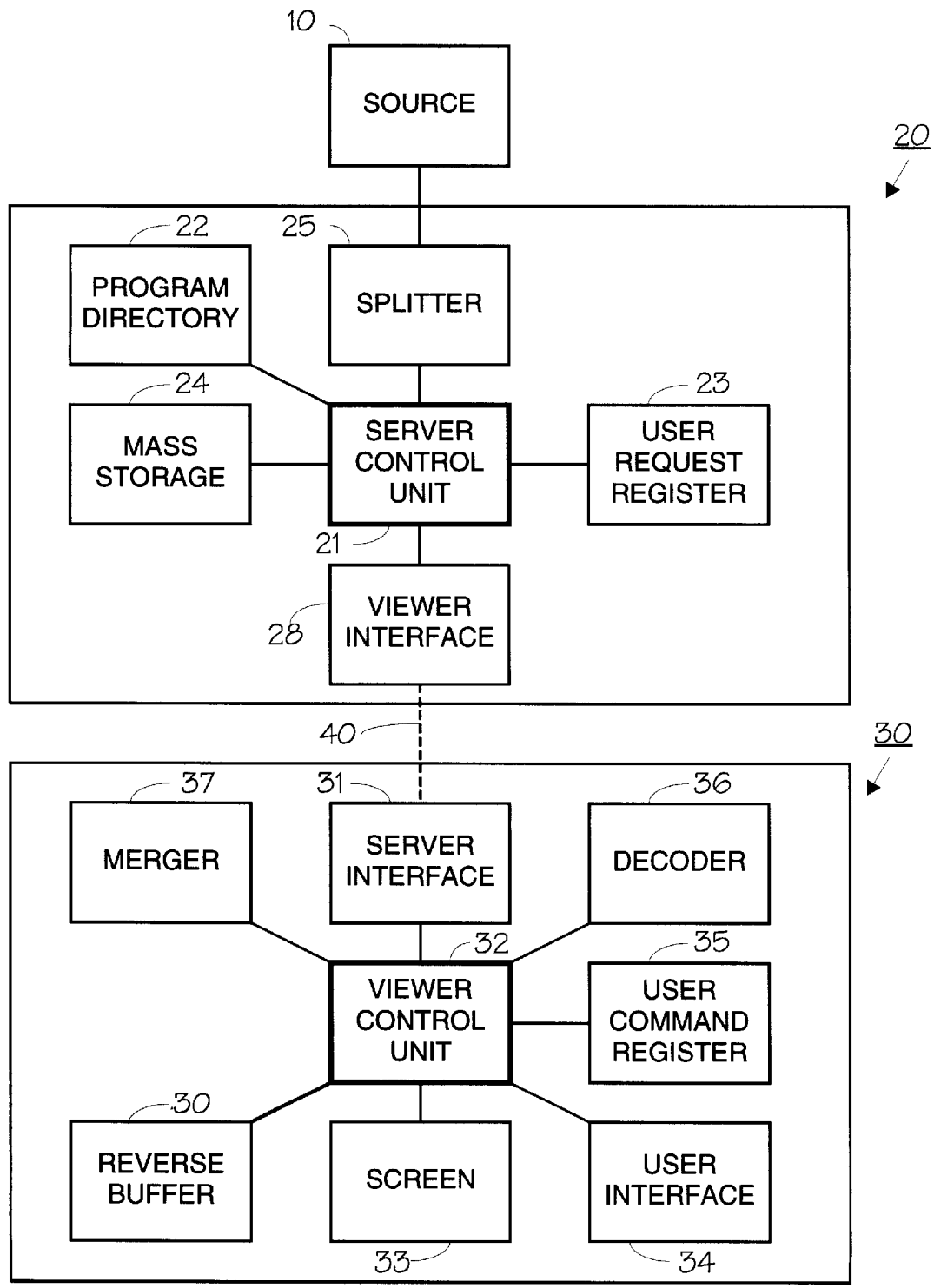
FIG. 7 is a schematic block diagram illustrating the main elements of a video system according to an alternative preferred embodiment of the present invention.

FIG. 7 illustrates an alternative embodiment wherein the merger circuitry (26, FIG. 5) and the reverse buffer (27, FIG. 5) are included in the viewer unit 30, at 37 and 38, respectively. The remaining construction and operation of the server unit 20 and the viewer unit 30 are otherwise the same, and therefore to facilitate and understanding, the same reference numerals have been used in FIG. 7 for the same components as in FIG. 5. Thus, in the Normal PLAY Mode, the server 20 transmits the anchor data from its Anchor Data file 2, the complemental data from its Complemental Data file 3, and the pointer data from its Pointer file 4, to the viewer unit 30, via communication link 40; the merger circuitry 37 of the viewer unit 30 effects the merger of the anchor data and complemental data, under the control of the Pointer file 4, and the merged compressed data is decompressed by the viewer decoder 36 for display on the viewer screen 33. Upon inputting a Fast Forward PLAY (FFWD) command, the server 20 only transmits to the respective viewer unit 30 the anchor data in file 2 of the server, which data is decoded in decoder 36 and displayed in screen 33. Upon inputting a Fast Backward PLAY (FBWD) command, only the anchor data from the server file 2 is transmitted to the viewer, but in this case the data is first temporarily stored in the reverse buffer 38 of the respective viewer before reversed, decoded and displayed on the screen of the viewer.

The embodiment of FIG. 7 thus adds the above-described merger and reverse-buffer tasks to the viewer, thereby freeing the server 20 from these tasks.

Figure 8:
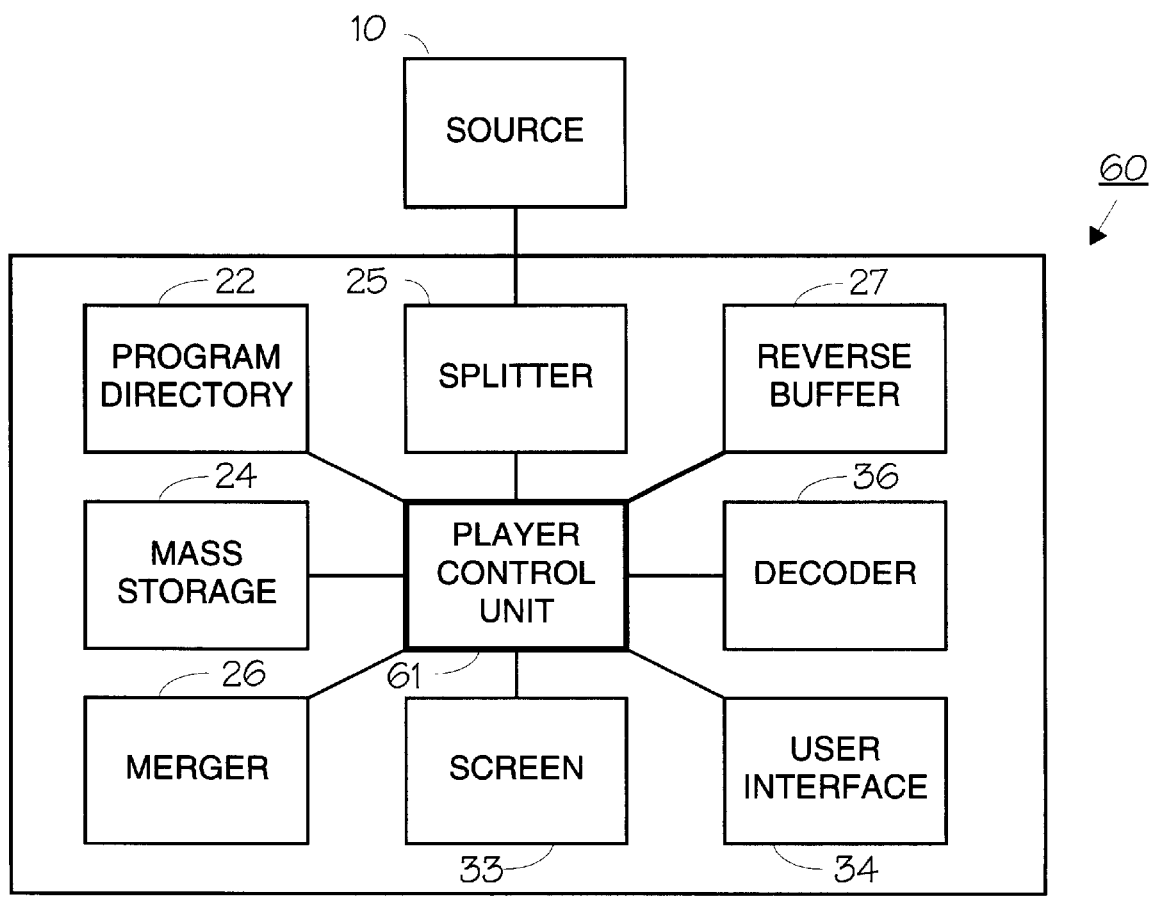
FIG. 8 is a schematic block diagram illustrating a further preferred embodiment of the invention wherein both the storage and the viewing functions are implemented in a single unit.

FIG. 8 illustrates a further embodiment wherein the above-described server and viewer functions are implemented in a single unit, called a player unit generally designated 60. Thus, the single unit 60 includes: the program directory 22; the mass storage device 24 containing the Anchor Data file 2, the Complemental Data file 3, the Pointer file 4, and the Anchor-Start file 5; the splitter 25; the merger 26; and the reverse buffer 27 of the server 20 illustrated in FIG. 5. It also includes: the user interface 34; the decoder 36; and the screen 33 of the viewer unit 30 illustrated in FIG. 5. It further includes a player control unit 61 controlling all the above-described units. Since all the functions are implemented in a single unit 60, the system illustrated in FIG. 5 obviates the need for a user request register 23, a viewer interface 28, a server interface 31, and a communication link 40, as illustrated in FIG. 5.

While the invention has been described with respect to several preferred embodiments, it will be appreciated that these are set forth merely for purposes of example, and that many variations may be made. For example, the Anchor Data file could include, not only the anchor data (e.g., the I-frames in the MPEG standard), but some of the complemental data (e.g., selected ones of the P-frames in the MPEG standard). Also, the I-frames may be in different anchor files; for example, there could be two anchor files, one for the odd I-frames and the other for the even I-frames, or one anchor file for each fifth I-frame, and the other anchor file for the other I-frames. Thus, in a Fast PLAY Mode, the data of only one anchor data file (e.g., even I-frames, or each fifth I-frame) could be displayed to produce an even faster PLAY. It will be further appreciated that the splitting function could be performed off-line, even at a different location, and stored in the respective files for transmission to the user unit when requested. Further, many of the described functions, such as the "merger" function, can be performed by software rather than by discrete circuitry. Also certain types of complemental data (e.g., the P-frames and the B-frames) may be stored in different complemental data files than other types of complemental data (e.g., the audio, headers, text, etc.), to facilitate editing at the viewer level.

Many other variations, modifications and applications of the invention will be apparent.

What is claimed is:

1. A method of processing a coded data stream including video information supplied from a storage device for purposes of selectively displaying said video information according to either a Normal PLAY Mode, or a Fast PLAY Mode, as selected by a user, said method comprising:

splitting said coded data stream into (a) anchor data, constituted of anchor picture frames coded without reference to other picture frames, and (b) complemental data, complementing the anchor data and including predictive picture frames coded in accordance with motion compensation predictions from anchor picture frames and other predictive picture frames;

storing said anchor data in an anchor data file;

storing said complemental data in a complemental data file separate from said anchor data file;

upon the selection of the Normal PLAY Mode, combining the data of said anchor data file and said complemental data file to recompose and display the video information of said coded data stream; and upon the selection of a Fast PLAY Mode, displaying the video information of only said anchor data file.

2. The method according to claim 1, further comprising:

generating and storing in a pointer file at least the address of each of said anchor picture frames in the anchor data file, and each of said predictive picture frames in said complemental data file;

and utilizing the data in said pointer file to combine the data in said anchor data file and complemental data file when recomposing and displaying the video information of said coded data stream.

3. The method according to claim 2, wherein said video information in said coded data stream is MPEG compressed digital data, in which:

said anchor picture frames are intra-coded picture frames (I-frames), and said predictive picture frames include unidirectionally-predictive picture frames (P-frames), and bidirectionally-predictive frames (B-frames).

4. The method according to claim 2, wherein said coded data stream also includes audio information which is also stored in said complemental data file at addresses stored in said pointer file, and played back with the recomposed and displayed video information upon the selection of the Normal PLAY Mode.

5. The method according to claim 2, wherein said coded data stream also includes user-input information which is split from the coded data stream, stored in said complemental data file at addresses stored in said pointer file, and combined with the recomposed and displayed video information upon the selection of the Normal PLAY Mode.

6. The method according to claim 2, further comprising:

generating an Anchor-Start file to contain the addresses in the pointer file to the starts of anchor picture frames to be used during a SKIP mode of operation;

and utilizing said Anchor-Start file for controlling said pointer file when recomposing and displaying said video information upon the selection of a SKIP Mode of Operation.

7. The method according to claim 2, wherein:

said Fast PLAY Mode includes a Fast Forward PLAY Mode and a Fast Backward PLAY Mode selectable by the user;

selection of said Fast Forward PLAY Mode causes the anchor picture frames to be displayed in the forward sequence;

selection of said Fast Backward PLAY Mode causes the anchor picture frames to be stored in a reverse buffer, and then to be displayed in the backward sequence from said reverse buffer.

8. Apparatus for processing a coded data stream including video information supplied from a storage device for purposes of selectively displaying said video information according to either a Normal PLAY Mode, or a Fast PLAY Mode, as selected by a user, said apparatus comprising:

a user-input device for inputting Normal PLAY Mode and Fast PLAY Mode commands;

a display screen;

a mass storage device including an anchor data file and a complemental data file;

and a control system for:

splitting said coded data stream into (a) anchor data, constituted of anchor picture frames coded without reference to other picture frames, and (b) complemental data, complementing the anchor data and including predictive picture frames coded in accordance with motion compensation predictions from anchor picture frames and other predictive picture frames;

storing said anchor data in an anchor data file;

storing said complemental data in a complemental data file separate from said anchor data file;

upon the inputting of the Normal PLAY Mode command, combining the data of said anchor data file and said complemental data file to recompose and display the video information of said coded data stream; and upon the inputting of a Fast PLAY Mode command, processing and displaying the video information of only said anchor data file.

9. The apparatus according to claim 8, wherein said mass storage device further includes a pointer file; and wherein said control system also:

stores in said pointer file the address of each of said anchor picture frames in the anchor data file, and said predictive picture frames in said complemental data file;

and utilizes the data in said pointer file to combine the data in said anchor data file and complemental data file when recomposing and displaying the video information of said coded data stream upon the inputting of the Normal PLAY Mode command.

10. Apparatus for processing a coded data stream including video information for selectively displaying the video information according to either a Normal PLAY Mode or a Fast PLAY Mode, as selected by a user, said video information being supplied from:

an anchor data file, constituted of anchor picture frames coded without reference to other picture frames;

a complemental data file, constituted of data complementing the anchor data and including predictive picture frames coded in accordance with motion compensation predictions from anchor picture frames and other predictive picture frames; and a pointer data file, containing the addresses of said anchor picture frames in the anchor data file and said predictive picture frames in said complental data file;

said apparatus including a control system for performing the following operations:

upon the inputting of the Normal PLAY Mode command, utilizing said data in the pointer data file for combining the data of said anchor data file and said complemental data file to recompose and display the video information of said coded data stream;

and upon the inputting of a Fast PLAY Mode command, processing and displaying the video information of only said anchor data file.

11. The apparatus according to claim 10, wherein said video information in said coded data stream processed by said control system is MPEG compressed digital data in which:

said anchor picture frames are intra-coded picture frames (I-Frames);

and said predictive picture frames include unidirectionally-predictive picture frames (P-Frames), and bidirectionally-predictive frames (B-Frames).

12. The apparatus according to claim 11, wherein said coded data stream also includes audio information which is split from the coded data stream by said control system, stored in said complemental data file at addresses stored in said pointer file, and played back with the recomposed and displayed video information upon the selection of a Normal PLAY Mode.

13. The apparatus according to claim 11, wherein said coded data stream also includes user-input information which is split therefrom by said control system, stored in said complemental data file at addresses stored in said pointer file, and combined with the recomposed and displayed video information upon the selection of the Normal PLAY Mode.

14. The apparatus according to claim 10, wherein said control system also utilizes an Anchor-Start file for controlling said pointer file when recomposing and displaying said video information upon the inputting of a Skip command.

15. The apparatus according to claim 10, wherein:

said Fast PLAY Mode includes a Fast Forward PLAY Mode and a Fast Backward PLAY mode selectable by the user via said user-input device; and wherein said control system:

upon the selection of the Fast Forward PLAY Mode, causes the anchor picture frames to be displayed in the forward sequence;

and upon the selection of the Fast Backward PLAY Mode, causes the anchor picture frames to be stored in the reverse order in a reverse buffer, and then to be displayed in the backward sequence from said reverse buffer.

16. The apparatus according to claim 8, wherein the apparatus includes a server unit and a viewer unit connected to said server unit;

said server unit including said mass storage device and the portion of said control system controlling the splitting and storing of said anchor data and complemental data;

said viewer unit including said user input device, said display screen, and the portion of said control system controlling the combining of the data and the display thereof in said screen.

17. The apparatus according to claim 16, wherein said server unit is at a central location, and wherein there are a plurality of said viewer units at remote locations connected by a communication link to said server unit.

18. The apparatus acocording to claim 16, wherein both said server unit and said viewer unit are at the same location.

* * * * *